Patented Oct. 2, 1951

2,570,056

UNITED STATES PATENT OFFICE 2,570,056

EMULSION POLYMERIZATION OF VINYL HALIDES

Paul Halbig, Fribourg, Switzerland

No Drawing. Application February 27, 1948, Serial No. 11,835. In Switzerland May 28, 1943

Section 1, Public Law 690, August 8, 1946
Patent expires May 28, 1963

3 Claims. (Cl. 260—92.8)

It is well known in the art to prepare polymers from vinyl compounds, e. g. vinyl ethers, vinyl esters, vinyl cyanides, vinyl carboxylic acids and their derivatives (acrylic and methacrylic compounds), divinyl compounds and substituted divinyl compounds, vinyl benzene and mixtures of these substances, by treating the monomeric starting materials in liquid state undiluted, dissolved or emulsified discontinuous or in a continuous process with suitable catalysts. When these processes are worked in a commercial scale, considerable difficulties are encountered since the reaction occurs in a strongly exothermic way, while a uniform rate of the reaction often is easily prevented by factors which cannot be foreseen. The spontaneous reaction of larger amounts of these starting materials provokes a raising of temperature and pressure which may have the character of dangerous explosions, but also minor variations of the working temperature may have an unfavourable effect on the quality of the polymers. The polymerisation therefore is usually carried out with only small amounts of starting materials either by working in a continuous process or by introducing the substance to be polymerised only by and by in small portions into the room of polymerisation. When proceeding in this manner, it will scarcely be possible to control the feed of monomeric substance in accordance with the speed of the polymerisation reaction because it is very difficult to ascertain whether the reaction has started or is retarded and how far it has proceeded. Even when working in this manner, it might therefore be possible that larger amounts of starting material accumulate in the reaction room, which will give raise again to the aforementioned dangers and difficulties. These conditions are especially spiteful in the case of the emulsion-polymerisation process. So it may occur that the emulsion breaks down or coagulates prematurely whereby the conditions of the reaction are changed radically and considerable difficulties are encountered.

I have now discovered a special rule of working such polymerisation reactions on a large scale, by which the concentration of the substances to be polymerised may be readily determined and controlled according to the proceeding of the reaction, so that pressure and temperature are kept within the desired range in every case.

This rule consists in the combination of the following measures:

1. One works in the neighbourhood of the pressure corresponding to the saturation pressure of the substance to be polymerised at the desired polymerisation temperature.

2. The concentration of the substance to be polymerised in the polymerisation-room is held at the limit, where the saturation pressure is lowered due to the disappearance of relatively little amounts of liquid polymerisable substance. This disappearance is due to the polymerisation process, i. e. to the transfer of the polymerisable substance into the polymer.

3. The decrease of pressure obtained in this manner indicates that further amounts of the polymerisable substances can now be added, whereupon this addition is effected immediately.

4. Finally, the feed of polymerisable substance is interrupted as soon as the above mentioned working pressure (saturation pressure) is built up again.

The limit of concentration of the substances to be polymerised in the polymerisation zone is the point where these substances are present as liquid just in smallest amounts. This condition is established when at a constant temperature the pressure in the polymerisation vessel does not increase and remains constant even upon addition of further portions of the substance to be polymerised. When this stage is reached, or at least a short time afterwards, the feed is interrupted and only then started again, when the pressure decreases again. This condition can be maintained with the aid of the usual measuring instruments and dosage devices and may be controlled by hand or automatically by coupling the measuring instrument and the dosage device in a manner known per se. The prevailing of the desired condition is at any time easily established by the pressure decrease, even then when the observer should casually not know the prior occurrences and will not wait until the pressure decrease takes place again. In such a case he needs only to open a valve and to blow off so much gas that a somewhat decreased pressure (at the same temperature) remains constant. In this manner he will be sure that the limit according to the invention is lowered, whereupon the feed is started again in the manner described above until pressure constancy is just reached. This method of controlling the condition of the polymerisation by blowing off gas is however only used in cases where the process could not sufficiently be observed or recorded.

The heat transfer necessary for maintaining the desired polymerization temperature is performed as usual by means of suitable baths or cooling devices. Even in very large plants the temperature may be kept constant within narrow limits with simple means, due to the fact that when working according to the invention there will never occur a casual reaction-shock of an undesired extent.

The dosage and feed of the polymerisable substance depending on the pressure in the polymerisation-vessel is controlled by handling a suitable device either by hand or automatically. For example the substance to be polymerised may be stored in a recipient vessel under nitrogen pressure which is somewhat higher than the pressure prevailing in the reaction vessel or the recipient vessel is kept at a higher temperature than the polymerisation liquid and the feed controlled by means of a valve in such a manner that the pressure according to the invention in the autoclave is just maintained. It is also possible to control automatically a pump by means of the described difference in pressure. In this case the pump is started when the pressure decreases and works until the pressure is again constant. So it may be possible to avoid the use of a pressure resistant recipient vessel. The amount of each feed is determined by suitable indicating devices, e. g. a balance or a levelling tube.

The process according to the present invention may be used for many purposes and also be modified. So it is possible to work at a defined temperature or with a predetermined temperature scheme, as it has been proposed for many polymers, by polymerising a certain amount at 50° C. and another amount at 60° C., maintaining in every case the concentration which, according to the invention, is easily determined. The polymerisation may be effected with or without solvents and diluents. The process of the invention is especially adapted for the emulsion-polymerisation. As long as the emulsion in the polymerisation-vessel contains still small amounts of polymerisable substance, the saturation pressure of the latter will prevail therein. Due to the polymerisation the liquid phase, i. e. the emulsified polymerisable substance, disappears from the emulsion with formation of solid emulsified polymer. Immediately after this formation the pressure decreases below the saturation pressure of the polymerisable substance, so that one will take care that small amounts of fresh polymerisable substance, as such (whereby it will be emulsified immediately) or in form of a preformed emulsion are fed into the reaction-vessel until the saturation pressure is again built up. In this case too it is possible that only small amounts of polymerisable substance are present in the reaction vessel.

This method of working may be used as well for the polymerisation of individual substances as for the preparation of mixed polymers; when producing mixed polymers, it is necessary to adjust the pressure to the saturation pressure of that polymerisable component which has the lowest boiling point. In the latter case the saturation pressure of the component having the lowest boiling point is used as indicator, so as to have a measure for the concentration of the lowest boiling substance, which is of advantage in controlling the proceeding of the polymerisation. It is also possible to work at any desired pressure if the temperature is so chosen that the saturation pressure prevails; vinyl acetate for example may in this manner be polymerised at a pressure of about 400 mm. mercury (i. e. in vacuo) and a temperature of 54° C., whereby a valuable polymer is obtained.

The process of the invention offers the advantage that the polymerisation reactions can be effected with low concentrations of the polymerisable substances, in a fast and uniform manner, without risk of a spontaneous reaction of large amounts. It would appear that this method would result in a considerable decrease of the polymerisation speed, due to the low concentration of the substances to be polymerised. Surprisingly, this is however not the case, and the polymerisation proceeds fast in any case. It has also been observed that in certain cases the polymerisation proceeds even faster than in the processes known hitherto.

A further advantage which was not to be expected is the outstanding quality of the polymers obtained, which fact may be due to the uniform proceeding of the reaction.

The invention will now be explained by the following example, but it is in no way intended to limit it thereon.

*Example*

An autoclave provided with stirrer is combined with a recipient vessel by a duct which is so arranged that it merges near the bottom of the autoclave. The recipient vessel contains about 500 parts of liquid vinyl chloride at room temperature, i. e. under a pressure of about 3 atmospheres. The autoclave contains 1000 parts of water, 2 parts of sodium stearate, 1 part of sodium carbonate and 5 parts of potassium persulfate. The contents of the autoclave are automatically kept at a constant temperature of 45° C.±1° C., by means of a water bath fitted with heating and cooling devices. (The temperature may also be kept within narrower limits.) When the temperature of 45° C. is reached, vinyl chloride from the recipient vessel is injected by means of a pump while rapidly stirring until the pressure has increased to about 6.5 atmospheres and remains constant. This constant pressure is reached when 50 parts are introduced. During the next 20 minutes the pressure remains constant, and no vinyl chloride is introduced during this time. Then the pressure begins to decrease so that one has to supply constantly with increasing speed fresh vinyl chloride in order to maintain the starting pressure of 6.5 atmospheres. In this manner, 280 parts of vinyl chloride are taken up after 2 hours. Then the feed of vinyl chloride is stopped and the mass hold at the same temperature of 45° C. for further 30 minutes, the pressure decreasing to about 5 atmospheres. Then the excess of vinyl chloride is blown off. The autoclave now contains a milky liquid with a polyvinyl chloride content of about 250 parts. The polymer may be separated from this latex in a known manner in a fine powdery state. It is also possible to draw off only a part of the latex and to supply a corresponding amount of fresh "serum" and then continue the polymerisation as described above so that the process is a continuous and very efficient one. It is also possible to make first an emulsion of the monomeric substance in the aqueous serum, e. g. at room temperature and then feed this emulsion into the autoclave, the further proceeding being the same as above described with the difference that the autoclave has preferably a tubular form or is U-shaped. At the one end the monomeric emulsion is introduced according to the principles of the invention herein set forth, while at the other end the finished latex is drawn off.

What I claim is:

1. The method of carrying out the portionwise emulsion homopolymerization of a monomeric vinyl halide in a polymerization chamber maintained at a polymerization temperature and containing a mixture of water, an emulsifying agent and a polymerization catalyst and a vapor space above said mixture, which method comprises introducing a portion of the monomeric vinyl halide into said polymerization chamber until a constant total pressure corresponding essentially to the saturation pressure of the said monomeric vinyl halide at said polymerization temperature is established therein, discontinuing the introduction of said monomeric vinyl halide into said chamber as soon as the said total pressure is established, effecting the polymerization at said polymerization temperature and said total pressure and continuing said polymerization without the addition of further monomeric vinyl halide until the pressure begins to decrease in said chamber, thereupon introducing additional monomeric vinyl halide and discontinuing the introduction of such additional monomeric vinyl halide as soon as the pressure in the polymerization chamber has been re-established to said total pressure, and continuing the polymerization in accordance with the general procedure above recited.

2. The method according to claim 1, wherein the said halide is monomeric vinyl chloride.

3. The method according to claim 2, wherein the chloride is introduced into said polymerization chamber in the form of liquid vinyl chloride.

PAUL HALBIG.

REFERENCES CITED

The following references are of record in the file of this patent:

UNITED STATES PATENTS

| Number | Name | Date |
|---|---|---|
| 2,068,424 | Mark | Jan. 19, 1937 |
| 2,179,040 | Heuer | Nov. 7, 1939 |
| 2,342,400 | Hopff et al. | Feb. 22, 1944 |
| 2,409,679 | Hanford et al. | Oct. 22, 1946 |
| 2,482,771 | Heerema | Sept. 27, 1949 |

FOREIGN PATENTS

| Number | Country | Date |
|---|---|---|
| 331,265 | Great Britain | June 23, 1930 |